W. D. CHAMBERLAIN.
DUST PAN.
APPLICATION FILED MAY 19, 1909.
946,109.
Patented Jan. 11, 1910.
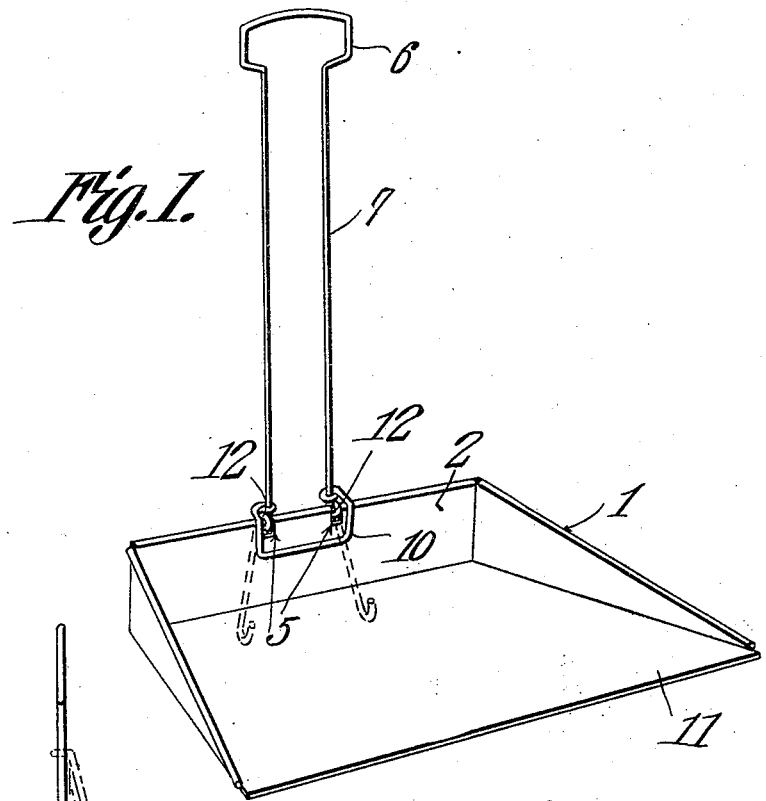
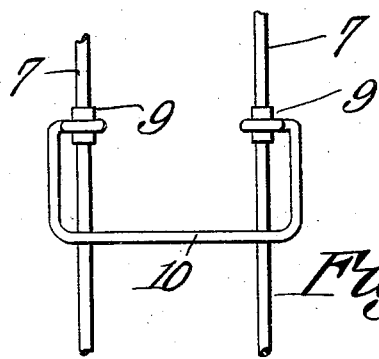
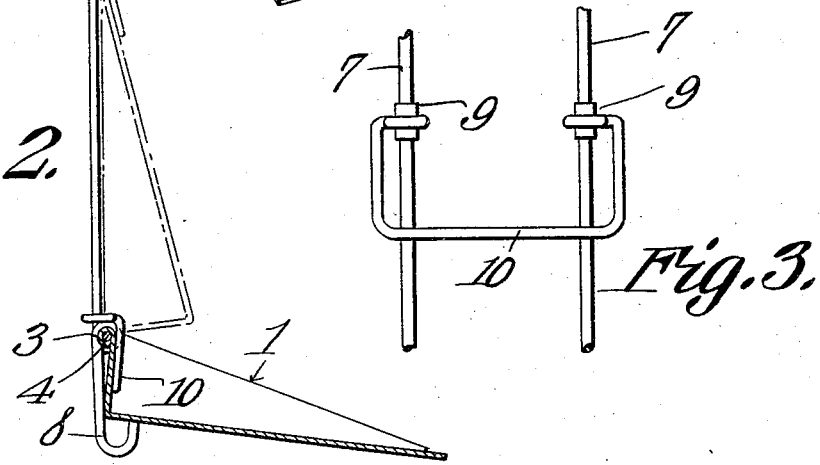
Witnesses
Inventor
William D. Chamberlain.
By C. A. Snow & Co.
Attorneys

UNITED STATES PATENT OFFICE.

WILLIAM D. CHAMBERLAIN, OF BUFFALO, NEW YORK, ASSIGNOR TO ELLA HEWES CHAMBERLAIN, OF BUFFALO, NEW YORK.

DUST-PAN.

946,109.  Specification of Letters Patent.  Patented Jan. 11, 1910.

Application filed May 19, 1909. Serial No. 497,022.

*To all whom it may concern:*

Be it known that I, WILLIAM D. CHAMBERLAIN, a citizen of the United States, residing at Buffalo, in the county of Erie and State of New York, have invented a new and useful Dust-Pan, of which the following is a specification.

The objects of the invention are, generally, the provision in a merchantable form, of a device of the class above described, which shall be inexpensive to manufacture, facile in operation, and devoid of complicated parts; specifically, the provision of a pan provided with a handle against which the lip of the pan is adapted to be upturned, the handle being provided with a catch adapted to engage the lip of the pan when the same is upstanding, and to engage the back of the pan to hold the handle substantially normal thereto when the pan is in use; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive and peculiar features of the device, it being understood, that, within the scope of what hereinafter thus is claimed, divers changes in the form, proportions, size and minor details of the structure may be made, without departing from the spirit or sacrificing any of the advantages of the invention.

Similar numerals of reference are employed to denote corresponding parts throughout the several figures of the drawings.

In the accompanying drawings, Figure 1 shows my invention in perspective; Fig. 2 is a vertical transverse section thereof; Fig. 3 is a front elevation showing a modified means whereby the catch is assembled with the handle.

In carrying out my invention, I provide, primarily, a pan denoted generally by the numeral 1. The back 2 of the pan is rolled over to form a bead 3, within which is disposed a rod 4. Intermediate its ends, the back 2 of the pan is notched upon its upper edge as denoted by the numeral 5.

The handle which is adapted to be assembled with the pan proper may roughly be described as being U shaped. At its upper end, the handle is broadened laterally to form a grip 6, and between this grip 6 and the lower extremity of the handle, the sides 7 thereof are bent about the rods to form a pivotal union between the handle and the pan 1, the portion of the sides 7 of the handle, thus bent, being disposed in the notches 5 in the back 2 of the pan.

Below the point of pivotal union between the handle and the pan 1, the lower extremity of the sides 7 of the handle are made to diverge as indicated in dotted lines in Fig. 1 and are extended a short distance below the bottom of the pan and terminally hooked as denoted by the numeral 8, the extremities of these hooked portions being adapted to engage the bottom of the pan to support the same in a slightly inclined position when the device is in use. I further provide a catch denoted generally by the numeral 10, which catch is of U shape, and is disposed substantially in a plane parallel to the plane of the sides 7 of the handle, a sliding union is formed between the catch 10 and the handle, by the extremities of the catch 10 being rectangularly bent and wrapped about the sides 7 of the handle. The function of this catch 10 will be obvious upon an examination of the drawings.

When the pan is in use, the catch 10, engaging the back 2 of the pan will serve to hold the handle substantially normal to the pan. The pan is adapted, as clearly shown in Fig. 2 to be upturned, to bring the lip 11 thereof into close relation with the handle. When the pan is disposed in the position last above pointed out, the catch 10 may be slid upward, and then dropped to engage the lip of the pan. When the device is in the position last above described, it is adapted to be hung up, occupying but a small space. The construction whereby the pan is adapted to be upturned, to bring the lip thereof into close relation with the handle, enables the handle to be made relatively long, so that when the device is in use, it is not necessary to assume a stooping position in order to use the device.

In Fig. 3, I have shown a slight modification of my invention, and the modification consists in mounting upon the sides 7 of the handle, tubular members 9, about which the extremities of the U shaped catch 10 are bent. The advantage incident to this construction is that, through the use of the tubular members 9, the catch is at all times maintained in a plane substantially normal to the sides 7 of the handle, any tilting of the catch being thereby obviated. The device, although simple in construction, enables a relatively long handle to be assembled with the pan, and, since the pan may be uptilted against the handle and there securely locked, the added length of the handle is no disadvantage. When the device is placed upon the floor, owing to the peculiar manner in which the hooked extremities 8 of the handle support the pan proper, the pan will readily assume the proper angle with respect to the floor surface.

Having thus described the invention, what I claim as new and desire to protect by Letters Patent is:

1. A device of the class described comprising a handle; a pan pivoted to the handle and arranged to be upturned to bring the lip of the pan in close relation to the handle; and a catch carried by the handle and arranged to engage the lip of the pan when the pan is upturned.

2. A device of the class described comprising a handle; a pan pivoted to the handle and arranged to be upturned to bring the lip of the pan into close relation with the handle; and a catch adjustably carried by the handle and arranged to engage, successively, the lip of the pan when the pan is upturned, and to engage the back of the pan to hold the handle substantially normal to the pan.

3. A device of the class described comprising a pan having its back rolled to form a bead and notched intermediate its ends; a rod disposed in the bead; a handle disposed in the notch and bent upon itself to engage the rod; and a catch carried by the handle and arranged to engage the pan to hold the handle substantially normal to the pan.

4. A device of the class described comprising a pan having its back rolled to form a bead and notched intermediate its ends, a rod disposed in the bead, a handle disposed in the notch and bent upon itself to engage the rod, the pan being arranged to be upturned to bring the lip thereof into close relation with the handle; and a catch carried by the handle and arranged to engage the lip of the pan when the same is upturned.

5. A device of the class described comprising a pan having its back rolled to form a bead and notched intermediate its ends, a rod disposed in the bead; a handle disposed in the notch and bent upon itself to engage the rod; the handle being arranged to be upturned to bring the lip of the pan into close relation with the handle; and a catch carried by the handle and arranged to engage, successively, the lip of the pan when the pan is upturned, and to engage the back of the pan to hold the handle substantially normal to the pan.

6. A device of the class described comprising a pan; a U shaped handle pivotally assembled with the pan; and a U shaped catch having its ends bent above the sides of the handle to form a sliding connection between the catch and the handle; the catch being arranged to engage the pan to hold the handle substantially normal to the pan.

7. A device of the class described comprising a pan; a U shaped handle pivotally assembled with the pan; and a U shaped catch having its ends bent upon the sides of the handle to form a sliding connection between the catch and the handle, the pan being arranged to be upturned to bring the lip thereof into close relation with the handle, and the catch being arranged to engage the lip of the pan when the pan is upturned.

8. A device of the class described comprising a pan; a U shaped handle pivotally assembled with the pan; the pan being arranged to be upturned to bring the lip thereof into close relation with the handle; and a U shaped catch having its ends bent above the sides of the handle to form a sliding connection between the catch and the handle, the catch being arranged to engage, successively, the lip of the pan when the pan is upturned, and to engage the back of the pan to hold the handle substantially normal to the pan.

9. A device of the class described comprising a pan; a U shaped handle pivotally assembled with the pan; tubular members slidably mounted upon the handle; and a U shaped catch having its ends bent above the tubular members; the catch being arranged to engage the pan to hold the handle substantially normal to the pan.

10. A device of the class described comprising a pan; a U shaped handle pivotally assembled with the pan; tubular members slidably mounted upon the handle, the pan being arranged to be upturned to bring the lip of the pan into close relation with the handle; and a U shaped catch terminally assembled with the tubular members and arranged to engage, successively, the lip of the pan when the pan is upturned, and to engage the back of the pan to hold the handle substantially normal to the pan.

11. A device of the class described comprising a pan; a U-shaped handle pivotally assembled with the pan; tubular members slidably mounted upon the handle, the pan being arranged to be upturned to bring the lip of the pan into close relation with the handle; and a U-shaped catch terminally assembled with the tubular members and arranged to engage the lip of the pan when the pan is upturned.

12. A device of the class described comprising a pan; a handle pivoted to the pan; a tubular member carried by the handle and arranged to slide thereon; and a catch assembled with the tubular member and arranged to engage the pan to hold the handle substantially normal to the pan.

13. A device of the class described comprising a handle; a pan pivoted to the handle and arranged to be upturned to bring the lip of the pan into close relation with the handle; a tubular member slidably mounted upon the handle and a catch assembled with the tubular member and arranged to engage the lip of the pan when the pan is upturned.

14. A device of the class described comprising a handle; a pan pivoted to the handle and arranged to be upturned to bring the lip of the pan into close relation with the handle; a tubular member slidably mounted upon the handle; and a catch assembled with the tubular member and arranged to engage, successively, the lip of the pan when the pan is upturned, and to engage the back of the pan to hold the handle substantially normal to the pan.

In testimony that I claim the foregoing as my own, I have hereto affixed my signature in the presence of two witnesses.

WILLIAM D. CHAMBERLAIN.

Witnesses:
    FRANCES M. HALEY,
    SARAH R. HALEY.